United States Patent [19]

Cabrera et al.

[11] Patent Number: 5,953,729

[45] Date of Patent: Sep. 14, 1999

[54] USING SPARSE FILE TECHNOLOGY TO STAGE DATA THAT WILL THEN BE STORED IN REMOTE STORAGE

[75] Inventors: Luis Felipe Cabrera, Bellevue; Stefan R. Steiner, Issaquah, both of Wash.

[73] Assignee: Microsoft Corporation, Redmond, Wash.

[21] Appl. No.: 08/997,066

[22] Filed: Dec. 23, 1997

[51] Int. Cl.$^6$ .................................................. G06F 17/30
[52] U.S. Cl. ........................................... 707/204; 711/161
[58] Field of Search .................................. 707/200–206, 707/1, 2; 711/147, 148, 161, 162, 171

[56] References Cited

U.S. PATENT DOCUMENTS

| | | | |
|---|---|---|---|
| 4,825,354 | 4/1989 | Agrawal et al. | 364/200 |
| 4,887,204 | 12/1989 | Johnson et al. | 364/200 |
| 4,914,571 | 4/1990 | Baratz et al. | 364/200 |
| 5,029,199 | 7/1991 | Jones et al. | 370/89 |
| 5,095,423 | 3/1992 | Gramlich et al. | 395/600 |
| 5,222,242 | 6/1993 | Choi et al. | 395/800 |
| 5,377,323 | 12/1994 | Vasudevan | 395/200 |
| 5,425,028 | 6/1995 | Britton et al. | 370/94.1 |
| 5,434,974 | 7/1995 | Loucks et al. | 395/200 |
| 5,493,607 | 2/1996 | Arumainayagam et al. | 379/88 |
| 5,564,037 | 10/1996 | Lam | 395/488 |
| 5,617,566 | 4/1997 | Malcolm | 707/204 |

OTHER PUBLICATIONS

Custer, Helen, "Chapter Four: Recoverability," *Inside the Windows NT File System*, (Microsoft Press 1994, ISBN 1–55615–660X), pp. 33–48.

Custer, Helen, "Chapter Six: Data Compression," Section 6.1, *Inside the Windows NT File System* (Microsoft Press 1994, ISBN 1–55615–660X), pp. 62–67.

Spector A., et al, "Uniting File Systems," *UNIX Review*, vol. 7, No. 3, pp. 61–70, Mar. 1989.

Baker, Steven, "New and Improved: NIS+ (Sun Microsystems Inc.'s Network Information Service+) (Net worth) ( Column)"; *UNIX Review*, vol. 11, No. 1, pp. 21–27; Jan. 1993.

Cabrera, Luis Felipe, et al., "QuickSilver Distributed File Services: An Architecture for Horizontal Growth," 2nd IEEE Conference an Computer Workstatioins, Santa Clara, CA; Mar. 7–10, 1988; pp. 23–37.

CAE Specification, System Management: Data Storage Management (XDSM) API, published by *The Open Group*; Feb. 1997.

Davies, D.W., et al., "Distributed System Architecture Model," Chapter 2; *Lecture Notes in Computer Science: Distrubuted Systems—Architecture and Implementation*; pp. 10–43; 1981.

Guy, Richard G., et al., "Name Transparency in Very Large Scale Distributed File System," *Processing of IEEE Workshop on Experimental Distributed Systems*; pp. 20–25; 1990.

(List continued on next page.)

*Primary Examiner*—Paul R. Lintz
*Assistant Examiner*—Hosain T. Alam
*Attorney, Agent, or Firm*—Workman, Nydegger, Seeley

[57] ABSTRACT

The present invention relates to systems and methods for archiving or backing up data. The systems and methods use a staging area to temporarily store data prior to transfer to backup or archive storage. Data is copied from local storage to the staging area and stored there temporarily until it is transferred to backup or archive storage. The staging area preferably uses sparse file technology which stores a mixture of zero data and non-zero data in a storage space substantially equal to the storage space required to only store the non-zero data. Once data is transferred from the staging area to remote storage, the storage space allocated in the staging area may be deallocated in order to minimize the amount of storage space required for the staging area. In addition, the local storage space may also be deallocated, if appropriate. Using sparse file technology as the staging area results in minimal storage requirements and minimal overhead for managing the storage space of the staging area.

16 Claims, 6 Drawing Sheets

OTHER PUBLICATIONS

Kistler, James J., and Satyanarayanan, M.; "Disconnected Operation in a Coda File System," pp. 213–225; 1991.

Ousterhout, John K. et al., "The Sprite Network Operating System," *Computer*, Vo. 21 (2); Feb. 1, 1988, pp. 23–36.

Page, Thomas W., Jr., et al.; "Management of Replicated Volume Location Data in the Focus Replicated File System," *USENIX Conference Procedings*, pp. 17–29; Summer 1991.

Robinson, D.C., and Sloman, M.S., Domains: A New Approach to Distributed System Management: IEEE; pp. 154–164; 1988.

Satyanarayanan, M.; "Distributed File System," Chaper 9; *Distributed Systems*; pp. 149–188; 1989.

Satyanarayanan, Madhadev, "Scalable, Secure, and Highly Available Distributed File Access," *Computer*, pp. 9–20; May 1990.

Satyanarayanan, Madhadev, "Coda: A Highly Available File System for a Distributed Workstation Environment," IEEE; pp. 447–459; Apr. 1990.

Sidebotham, Bob, "VOLUMES—The Andrew File System Data Structuring Primitive," *Proceedings of EUGG Autumn '86*; pp. 473–480; Sep. 1986.

Spector, Alfred Z.; "Thoughts on Large Distributed File Systems," *Proceedings of the German National Computer Conference*; pp. 1–10; Oct. 1986.

Walker, Bruce, et al., The LOCUS Distributed Operating System,: *ACM Operating System Review*; vol. 17, No. 5; pp. 49–70; 1983.

Wedde, Horst F., et al., "Distributed Management of Replicated and Partitioned Filed Under Dragon Slayer," The Fourteenth Annual International Computer Software & Applications Conference, Chidago, Illinois; Oct. 31–Nov. 2, 1990; pp. 436–441.

Welch, Brent, and John Ousterhout, "Prefix Tables: A Simple Mechanism for Locating Files in a Distributed System," The 6th International Conference on Distributed Computing systems, Cambridge, Massachusetts; May 19–23, 1986; pp. 184–189.

Welch, Brent, and Ousterhout, John; "Prefix Tables: A Simple Mechanism for Locating Files in a Distributed System," *Proceedings in the IEEE Sixth Conference Distributed Computing Systems*; pp. 184–189; May 1986.

Yeo, A.K., et al., A taxonomy of Issued in Name Systems Design and Implementation, *Operating Systems Review*; vol. 27 (3); Jul. 1993; pp. 4–18.

USING SPARSE FILE TECHNOLOGY TO STAGE DATA THAT WILL THEN BE STORED IN REMOTE STORAGE

BACKGROUND OF THE INVENTION

1. The Field of the Invention

This invention relates to systems and methods for transferring or archiving data from a local storage area to a remote storage area. More specifically, the present invention relates to systems and methods for temporarily storing or staging data prior to its transfer to remote storage.

2. The Prior State of the Art

Although computers were once an obscure oddity relegated to the backrooms of scientific and technical endeavors, computers have now entered mainstream society and have become an integral part of everyday life. An ever increasing amount of data is stored, managed, and manipulated by computers. The importance of the data stored on computers ranges from trivial to critical. In order to help protect important information, many systems and schemes have been devised that "backup" or "archive" information on various storage media. By maintaining multiple copies of important information, should one copy of the information become damaged or otherwise unavailable, the information can be retrieved from the backup storage media.

Although the functions of backup are archiving or often used synonymously, backup systems typically attempt to maintain multiple copies of important information so that should one copy of the information become damaged or unavailable the information may be retrieved from the other copy. Archive systems, on the other hand, typically attempt to maintain a complete history of the changes made to a particular entity, such as a particular file or storage device. Backup systems and archival systems, however, have much in common and many of the principles discussed or applied to one system are equally applicable to the other. For example, both systems typically copy data from a local storage medium to a backup or archival storage medium, sometimes located at a remote location. The process of transferring data from a local storage medium to a backup or remote storage medium is much the same in either case.

Copying data from a local storage medium to a backup storage medium either for backup or archival purposes is not an instantaneous process. The time it takes to transfer data from a local storage medium to a backup storage medium may be significant, depending upon the access time of the local and backup storage mediums and the amount of data to be transferred between the two storage mediums. Because the process is not instantaneous, several problems can arise. For example, if a particular file or volume is to be backed up, it is usually important not to allow the contents of the file or volume to change during the backup procedure so that a logically consistent backup copy is created. A logically consistent copy is a copy that has no internal inconsistencies. For example, suppose that a backup or archive was to be made to a database of financial transactions. Suppose also that an individual wished to transfer money from one account to another account while the backup was proceeding. If both the transaction debiting one account and the transaction crediting the other account are not backed up in the same backup copy, an internal inconsistency results.

To avoid such logical inconsistencies, several approaches may be used. One approach is to restrict or prevent access to a particular file during the archive or backup procedure. Such an approach works well in situations where it is feasible to cut off access to the file. In certain circumstances, however, such an approach is not feasible. Certain computer systems are used in operations where they must be on line twenty-four hours a day, seven days a week. In these environments, creating backup or archive copies of information stored thereon can be challenging. One approach to allowing access to files while archive or backup copies are created is to duplicate the information that will be backed up or archived and "stage" the information in a temporary storage area. The information may then be copied from the staging area and sent to backup or archive storage.

Unfortunately, copying information to a staging area creates some problems. For example, storage space must be set aside to store the staged data. As multiple copies of the data are created, the storage requirements necessary to create a successful backup or archive copy increase. It is, therefore, important to manage the staging storage space in a way which minimizes the excess storage space required to create or maintain backup or archive copies.

What is needed, therefore, is a staging mechanism which minimizes the storage space required to stage data prior to transfer to backup or archive storage. The staging mechanism should allow for a variable amount of storage space since the amount of data that needs to be staged may increase or decrease depending on widely varying factors. Furthermore, the management of storage in the staging area should take little or no intervention by the backup or archive system in order to minimize the administrative burden on the system.

Another problem sometimes encountered by backup or archive systems relates to the type of backup or archive media used. Certain forms of backup or archive media are most efficiently used when the backup or archive media is written as a collection of data of a defined size. For example, in certain systems it may be desirable to utilize optical disks as archive or backup storage. In many instances, it is more efficient to collect sufficient information to completely fill an optical disk before the data is backed up or archived. In such a situation, it is often desirable to move data that will be backed up or archived to a staging area until the staging area contains sufficient data to completely fill the backup media.

Staging areas used in this manner require the ability to place data into the staging area at sequential instances in time. It is often desirable in such instances to allocate the storage space required as data is identified that should be added to the backup or archive. Thus, it would be desirable to have a staging area that allows for a variable amount of storage space where the storage space can be dynamically allocated as data is produced. Again, it would be highly desirable to provide such a capability with little or no overhead on the backup or archive system.

SUMMARY AND OBJECTS OF THE INVENTION

The foregoing problems in the prior state of the art have been successfully overcome by the present invention which relates to systems and methods for archiving or backing up data using staging mechanisms which minimize the amount of storage space required for staging data while, simultaneously, minimizing the administrative burden on archive or backup systems. In order to minimize both the storage space and the administrative burden, the present invention uses sparse file technology to stage data prior to transfer to a remote storage medium. Within the context of this invention, backup or archive storage will be referred to as remote storage. The remote designation is intended to delineate storage separate and apart from the local storage volumes typically utilized by a computer system. Remote storage does not, necessarily, mean that the storage is located remotely from the archive system. Archive or backup storage may comprise any storage medium suitable for such a purpose. The location of such a storage medium may be local to the backup or archive system or may be remote from the backup or archive system.

Sparse file technology is a technology designed to efficiently store sparse data. Sparse data is data having certain portions of the data which contain useful or non-zero data and other portions of the data which contain zero data. Such a situation is often encountered, for example, in a sparsely populated matrix or spreadsheet where certain entries are non-zero but a large portion of the matrix or spreadsheet contains zero data. Sparse file technology is designed to store such information in a format that allows the zero data to be removed prior to storage on the local storage medium but recreated as the data is retrieved. Although any sparse file technology may be utilized by the present invention, one embodiment uses the sparse file capability of Windows NT to create staging areas with desirable properties.

Using the sparse file technology of Windows NT provides staging areas that can expand and contract according to the staging storage needs. When non-zero data is stored in a sparse file, storage space is automatically allocated sufficient to store the non-zero data. When zero data is stored in a sparse file or when data already stored in the sparse file is replaced with zero data, the zero data is removed and any storage space that has been zeroed is deallocated. Thus, the sparse file technology allows a mixture of zero data and non-zero data to be stored in a space substantially equal to the storage space required to store the non-zero data. Because storage space is automatically allocated and deallocated as necessary, staging areas using sparse file technology allow data to be appended or removed from the staging area with virtually no overhead to the backup or archive service.

A method using the present invention to backup or archive data begins when sufficient data exists on local storage that should be transferred to the staging area. For example, if a data producer is producing data and storing it on local storage, when a defined amount of data has been stored locally or when a particular time has elapsed, the data may be copied or moved from local storage to a staging area employing sparse file technology. Data moved to the area is stored in a sparse file which eliminates any zero portion as it is stored in the sparse file. The amount of data in the staging area may be monitored in order to identify when a backup or archive session should be initiated. In the alternative, the time since last backup or archive may be monitored and a session initiated when a particular time has elapsed. If additional data becomes available in local storage prior to the time that an archive or backup session is initiated, such data can he appended to the data already stored in the staging area. Once a backup or archive session is initiated, and data is moved from the staging area to remote storage, then there is no need to maintain the staging area copy of the data that has been backed up or archived. The storage space allocated to store the transferred data in the staging area may be safely released and deallocated. When sparse file technology is used, this may be accomplished by simply zeroing the data that has been backed up or archived. The sparse file technology will then deallocate and remove the zeroed data from local storage. In certain situations, it may also be possible to deallocate and remove storage space from the local storage area used by the data producer once the data has been copied to the staging area or after the data has been transferred to backup or archival storage.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The invention is described below by using diagrams to illustrate either the structure or processing of embodiments used to implement the system and method of the present invention. Using the diagrams in this manner to present the invention should not be construed as limiting of its scope. The present invention contemplates both methods and systems for the hierarchical storage of data. The embodiments of the present invention may comprise a special purpose or general purpose computer comprising various computer hardware, as discussed in greater detail below.

Embodiments within the scope of the present invention also include computer readable media having executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions or data fields and which can accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
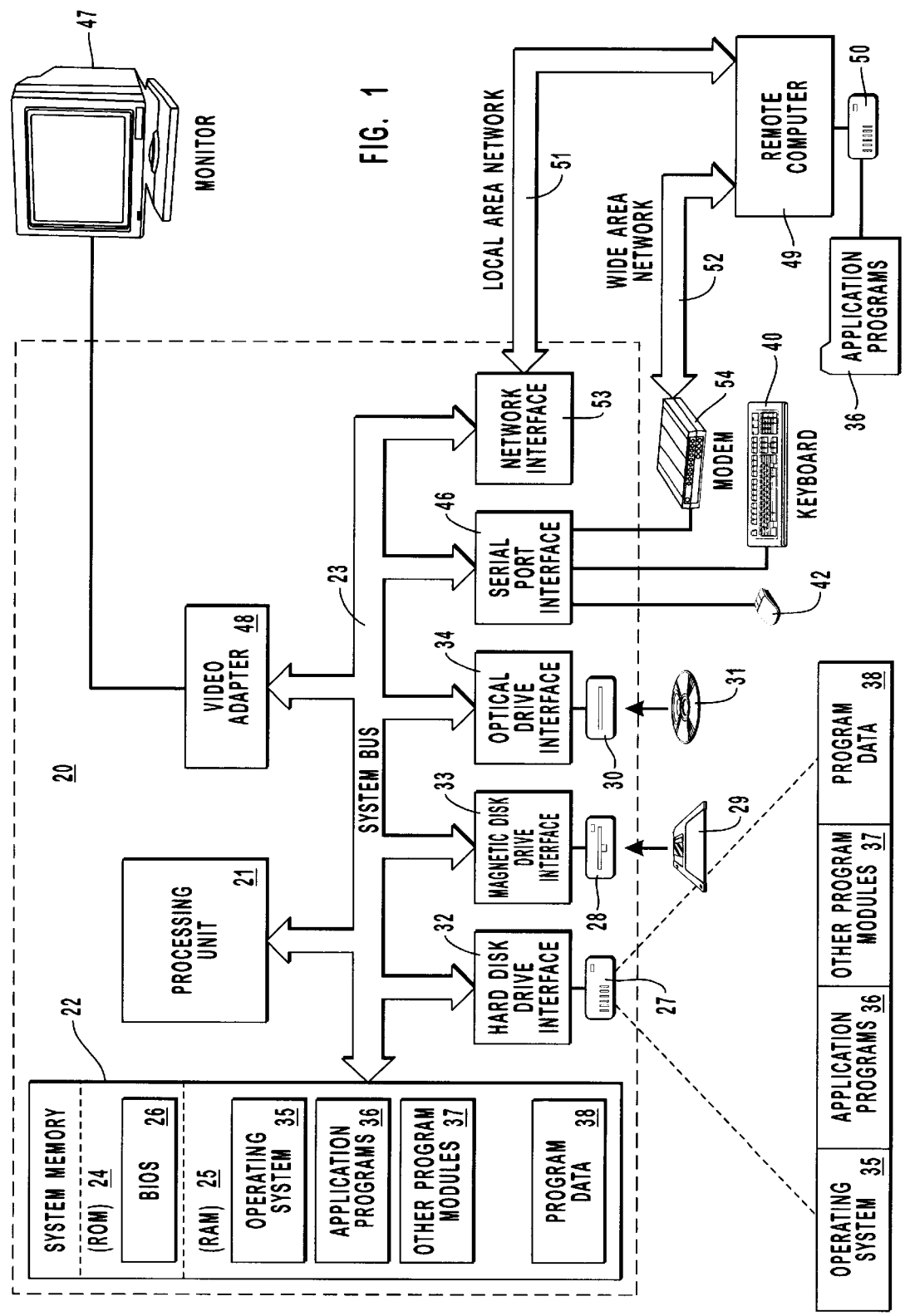
FIG. 1 is an example system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20. Although the exemplary environment described herein employs a magnetic hard disk 27, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in offices enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Examples of the present invention discussed herein typically utilize an archive service. It should be understood that the present invention may be applied to backup as well as archive systems. Thus, examples detailing archive systems or services are exemplary examples and should not be construed as limiting the scope of the present invention. Similarly, the storage where backup or archive copies are stored is referred to in the following examples as remote storage. This designation is given to indicate that the storage is separate and apart from the local storage typically used by a computer system. The remote designation is not necessarily used to identify the location of the backup or archive storage. For example, backup or archive storage which is directly attached to a particular computer system will also be referred to as remote storage even though the storage is not located at a remote location. Thus, the term remote storage is intended to be interpreted broadly and should include all backup and archive storage, both local and remote, that is separate from the local storage, such as a local hard disk, used to store data that will be backed up or archived to the backup or archive storage.

Figure 2:
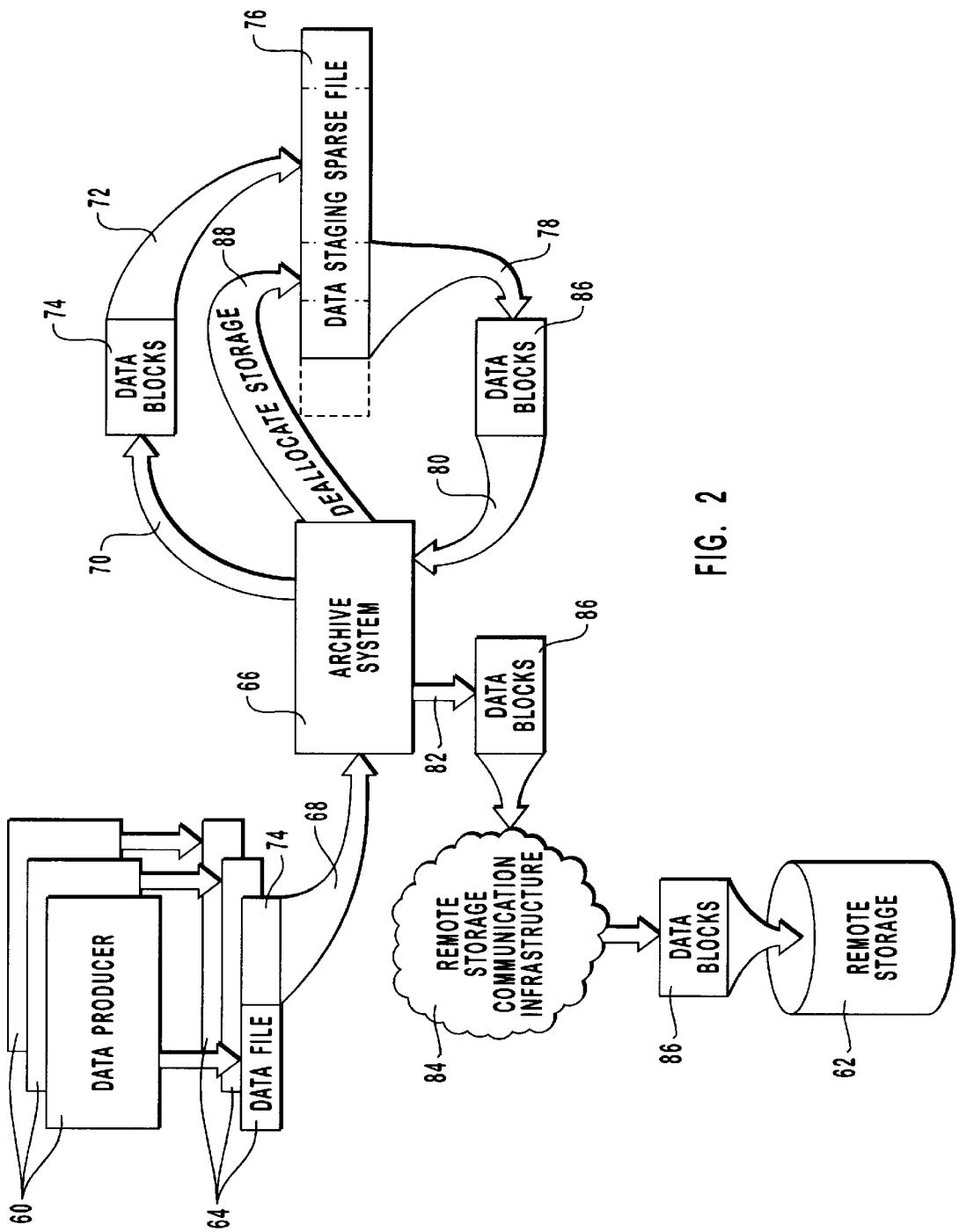
FIG. 2 is a high-level diagram of one embodiment of the present invention.

Referring now to FIG. 2, a high-level diagram of one embodiment of the present invention is illustrated. In FIG. 2, one or more data producers, such as data producer 60, creates data that is to be backed up or archived to a backup or archive storage device, such as remote storage 62. The data produced by data producer 60 is stored in a local storage medium, such as the hard disk for the local computer system. In FIG. 2, data producer 60 is illustrated as storing data in data file 64. Data file 64 represents a local storage area used by data producer 60 to store data it produces. Such data does not, necessarily, need to be stored in a data file in the traditional sense. However, such will most often be the case.

When a first event occurs, indicating that data local storage area should be transferred to a staging area, archive system 66 will move an appropriate amount of data from the local storage area, such as data file 64, to a staging storage area which is adapted for temporarily storing the data. Thus, embodiments within the present invention may comprise means for moving data from a local storage area used for data storage by a data producing service to a staging storage area used for temporarily staging the data. Any mechanism that performs this function may be utilized such as, for example, reading the data from the appropriate location and then storing a copy of the data in the staging storage area. Other mechanisms may also be utilized such as direct memory transfer and so forth. In FIG. 2, the means for moving data is illustrated by arrows 68, 70, and 72. These arrows illustrate blocks of data, such as data blocks 74 being moved from the local storage area to the staging storage area.

As previously discussed, it is desirable for the staging storage area to store data in an efficient manner so as to eliminate all unnecessary storage space. In one embodiment, the present invention uses means for storing sparse data comprising a mixture of zero data and non-zero data in a storage space less than or substantially equal to the storage space required to store the non-zero data. In other words, such a means can, as a minimum, substantially eliminate storage space equal to the space required to store zero data. This may be performed by substantially eliminating storage space required to store zero data as explained below or in any other way. Such a means may go further and compress the non-zero data in order to reduce the storage space required to store the non-zero data. However, such is not necessary for all embodiments of the present invention. It is, however, desirable that storage space equal to the storage space that would be required to store zero data to be substantially eliminated. By way of example, and not limitation, in FIG. 2 such means for storing is illustrated by data staging sparse file 76. Any type of technology may be utilized to implement sparse file 76. A suitable technology in Windows NT is discussed in greater detail below. All that is required is that sparse file 76 be able to store data comprising a mixture of non-zero data and zero data in a storage space substantially equally to the storage space required to store only the non-zero data.

When a second pre-determined event occurs, archive system 66 will transfer all or part of the data in sparse file 76 to remote storage 62. Thus, embodiments within the scope of the present invention may comprise means for transferring data from the staging storage area to a remote storage medium. By way of example, and not limitation, in FIG. 2 such means is illustrated by arrows 78, 80, and 82 which illustrate data being moved from sparse file 76 and delivered to remote storage communication infrastructure 84. Such a means may be implemented by any mechanism capable of retrieving data from sparse file 76 and either directly delivering the data to remote storage 62 or to an intermediate system or subsystem which will, in turn, deliver the appropriate data to remote storage.

In FIG. 2, the mechanism used by archive system 66 to deliver data to remote storage 62 is remote storage communication infrastructure 84. In some embodiments of the present invention, remote storage 62 may be directly attached to the computer system where archive system 66 resides. In such a situation, remote storage communication infrastructure 84 may be nothing more than the drivers and associated hardware devices used to store data on, or retrieve data from, remote storage 62. In other embodiments, however, remote storage 62 may be located at locations separate from the computer system where archive system 66 resides. In such embodiments, remote storage communication infrastructure 84 may represent various drivers, interface cards, networks, computer systems, subsystems, and the like necessary to allow archive system 66 to transfer data to remote storage 62. All that is required is the ability for archive system 66 to transfer information to remote storage 62, wherever remote storage 62 may be located.

After data, such as data blocks 86, has been transferred from sparse file 76 to remote storage 62, there is no need to maintain the data in sparse file 76. Thus, the data may be deleted from sparse file 76 and the storage previously taken up by the data deallocated in order to reduce the overall data storage requirements for sparse file 76. Thus, embodiments within the scope of this invention may comprise means for deallocating storage space in a staging storage area when data is transferred from the staging storage area to remote storage. By way of example, and not limitation in FIG. 2 such means is illustrated by arrow 88. The exact mechanism used to implement the means for deallocating storage will depend upon the technology used to implement sparse file 76 and portions of archive system 66. As discussed in greater detail below, if sparse file 76 automatically deallocates storage space when data stored in sparse file 76 is zero, then the means for deallocating may comprise a means for zeroing data in sparse file 76.

As previously explained, embodiments within the scope of this invention may comprise means for storing sparse data comprising a mixture of zero data and non-zero data in a storage space substantially equal to the storage space required to store the non-zero data. Such means may be any mechanism capable of performing this function. By way of example, such means has been previously described as comprising a sparse file. Any sparse file technology may be used to implement an appropriate means for storing. In one embodiment, however, the present invention utilizes the sparse file mechanism of the NT file system (NTFS). The Windows NT file system is described in *Inside the Windows NT File System*, by Helen Custer, published by Microsoft Press and incorporated herein by reference. Some of the more important features of the NTFS will be described below in order to illustrate the various components of the NTFS that are useful in the present invention. Such a discussion is given by way of example, and not limitation, as any other sparse file technology may also be used for the staging area of the present invention.

Figure 3:
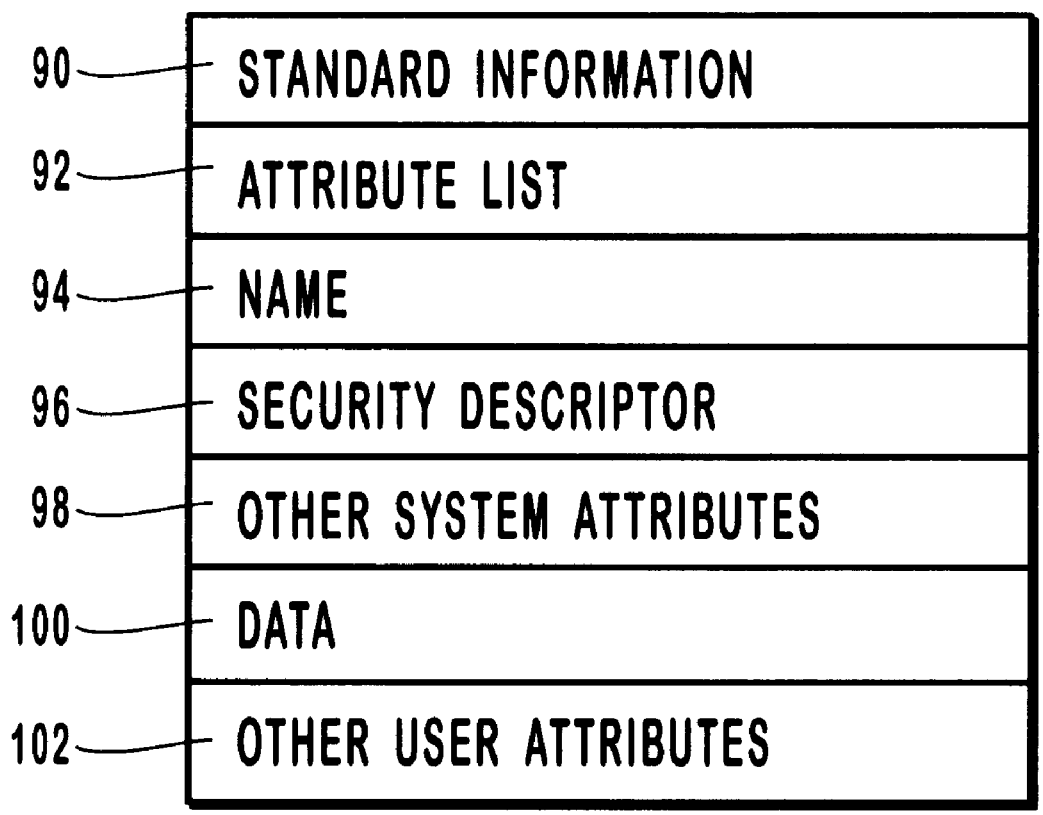
FIG. 3 is a diagram illustrating a file structure suitable for use with the present invention.

Referring now to FIG. 3, a diagram illustrating the various attributes of a Windows NTFS file is presented. In FIG. 3, the attributes that make up a file may be divided into two fundamental groups. The first group contains system attributes and the second group contains user attributes. In general, system attributes are used to store information needed or required by the system to perform its various functions. Such system attributes generally allow a robust file system to be implemented. The exact number and type of system attributes is generally dependent wholly upon the particular operating system or particular file system utilized. User attributes, on the other hand, are used to store user controlled data. That is not to say that users may not gain access, under certain circumstances, to one or more system attributes. User attributes, however, define storage locations where a user or client program may store data of interest to the program. In FIG. 3, the system attributes comprise standard information attribute 90, attribute list 92, name attribute 94, security descriptor 96, and other system attributes 98. User attributes include data attribute 100 and other user attributes 102.

Standard information attribute 90 represents the standard "MS-DOS" attributes such as read-only, system, hidden, and so forth. Attribute list 92 is an attribute used by NTFS to identify the locations of additional attributes that make up the file, should the file take up more than one storage record in the master file table. The master file table is the location where all resident attributes of a file or directory are stored. Name attribute 94 is the name of the file. A file may have multiple name attributes in NTFS, for example, a long file name, a short MS-DOS file name, and so forth. Security descriptor attribute 96 contains the data structure used by Windows NT to specify who owns the file and who can access it. Other system attributes 98 represents other system attributes that may be part of the NTFS file. These attributes are described in greater detail in *Inside the Windows NT File System*, previously incorporated by reference. An NTFS file typically has one or more data attributes illustrated in FIG. 3 as data attribute 100. Most traditional file systems only support a single data attribute. A data attribute is basically a location where user controlled data can be stored. For example, the document of a word processing document is typically stored in the data attribute of a file. In the NTFS file system, a file can have multiple data attributes. One data attribute is referred to as the "unnamed" data attribute while other attributes are named data attributes, each having an associated name. Each of the data attributes represents a storage location where different types of user controlled data may be stored.

In addition to one or more data attributes, a file may also have other user defined attributes as illustrated by other attributes 102. Such attributes represent any other attributes that are defined by a user and that are stored with the file. Such user attributes may be defined and created and used for any purpose desired by the user.

Although the above discussion has gone into some detail with regards to a particular type of file, such should be construed as exemplary only and not as limiting the scope of this invention. The present invention will work with any type of file or other entity.

Figure 4:
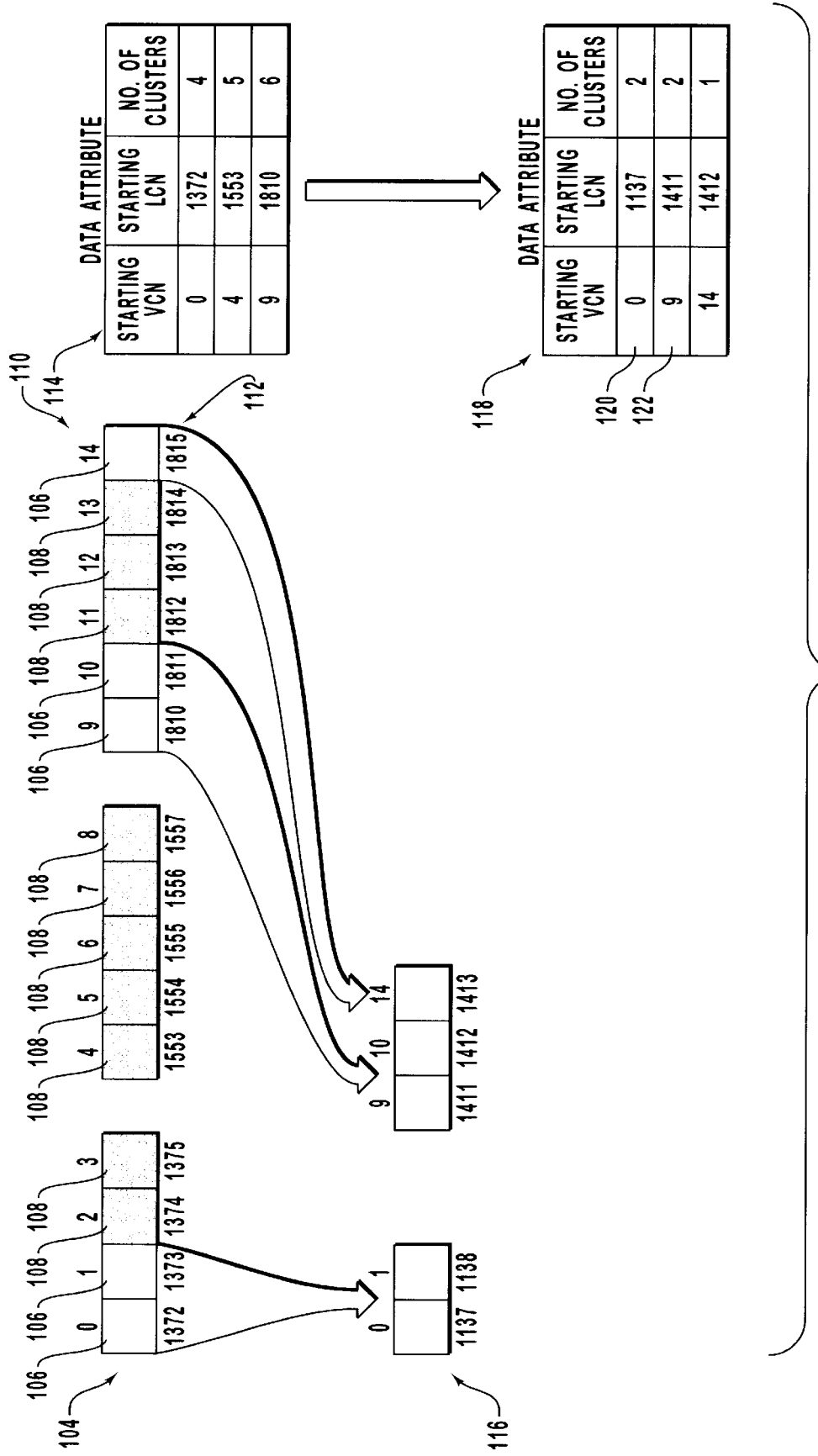
FIG. 4 is a diagram illustrating one example of sparse file technology.

Referring next to FIG. 4, one example of a sparse file storage mechanism is presented. The example illustrates the mechanism used by NTFS to store sparse files. More information may be found in Chapter 6 of *Inside the Windows NT File System*, previously incorporated by reference. In FIG. 4, a data file, shown generally as 104, has a mixture of non-zero data 106 (illustrated by the non-shaded blocks) and zero data 108 (illustrated by the shaded blocks). In NTFS a file stores data in a sequence of allocation units called clusters. NTFS uses virtual cluster numbers (VCNs), from zero through m, to enumerate the clusters of a file. Data file 104 has fifteen clusters numbered 0–14. In FIG. 4, the virtual cluster numbers of data file 104 are illustrated generally as 110. Each VCN maps to a corresponding logical cluster number (LCN), which identifies the disk location of the cluster. Data file 104 of FIG. 4 has three groups of clusters (disk allocations) numbered 1372–1375, 1553–1557, and 1810–1815. In FIG. 4, the logical cluster numbers are illustrated generally as 112.

In the NTFS, the data attribute of a file contains information that maps VCNs to LCNs. The data attribute of data file 104 is illustrated in FIG. 4 as 114. Note that the data attribute contains one entry for each of the disk allocations for the file.

In the above discussion, the term cluster is used to refer to a collection of sectors on a disk that define the minimum allocation unit. The NTFS defines mechanisms for determining how many sectors make up a cluster. More information on how clusters and sectors relate can be found in *Inside the Windows NT File System*, previously incorporated by reference. For the purposes of the present invention, the correspondence between clusters and sectors is irrelevant. The scheme illustrated in FIG. 4 will work irrespective of the number of sectors that make up a cluster.

As illustrated in FIG. 4, data file 104 contains several areas where the data is zero. These areas are VCN 2-8 and VCN 11-13. Since these clusters contain zeroes, there is no need to store the zero data on the disk as long as the location of the zero data can be reconstructed when an entity reads the data from the disk. In other words, the only clusters that need be physically stored on the disk are clusters VCN 0-1, VCN 9-10, and VCN 14. This is illustrated in FIG. 4 generally as 116 where VCN 0 and 1 are stored in LCN 1137 and LCN 1138, respectively, and VCNs 9, 10, and 14 are stored in LCNs 1411, 1412, and 1413, respectively.

By making appropriate entries into the data attribute, the location of the zero clusters can be reconstructed when the data is read. An example data attribute is illustrated generally as 118. As an example for how the data attribute allow reconstruction of the location of zero clusters, examine entry 120. Entry 120 indicates that VCN 0 starts at LCN 1137 and has a consecutive cluster count of 2. Thus, VCN 0 and 1 will be read starting at LCN 1137. Note, however, that entry 122 starts with VCN 9. Thus, VCN 2-8 must be zero clusters and, when a read request is received, these clusters can be reconstructed by inserting an appropriate number of zero clusters after VCN 0 and 1. More information on how NTFS uses sparse file technology to compress and eliminate zero clusters can be found in Chapter 6 of *Inside the Windows NT File System*, previously incorporated by reference.

Figure 5:
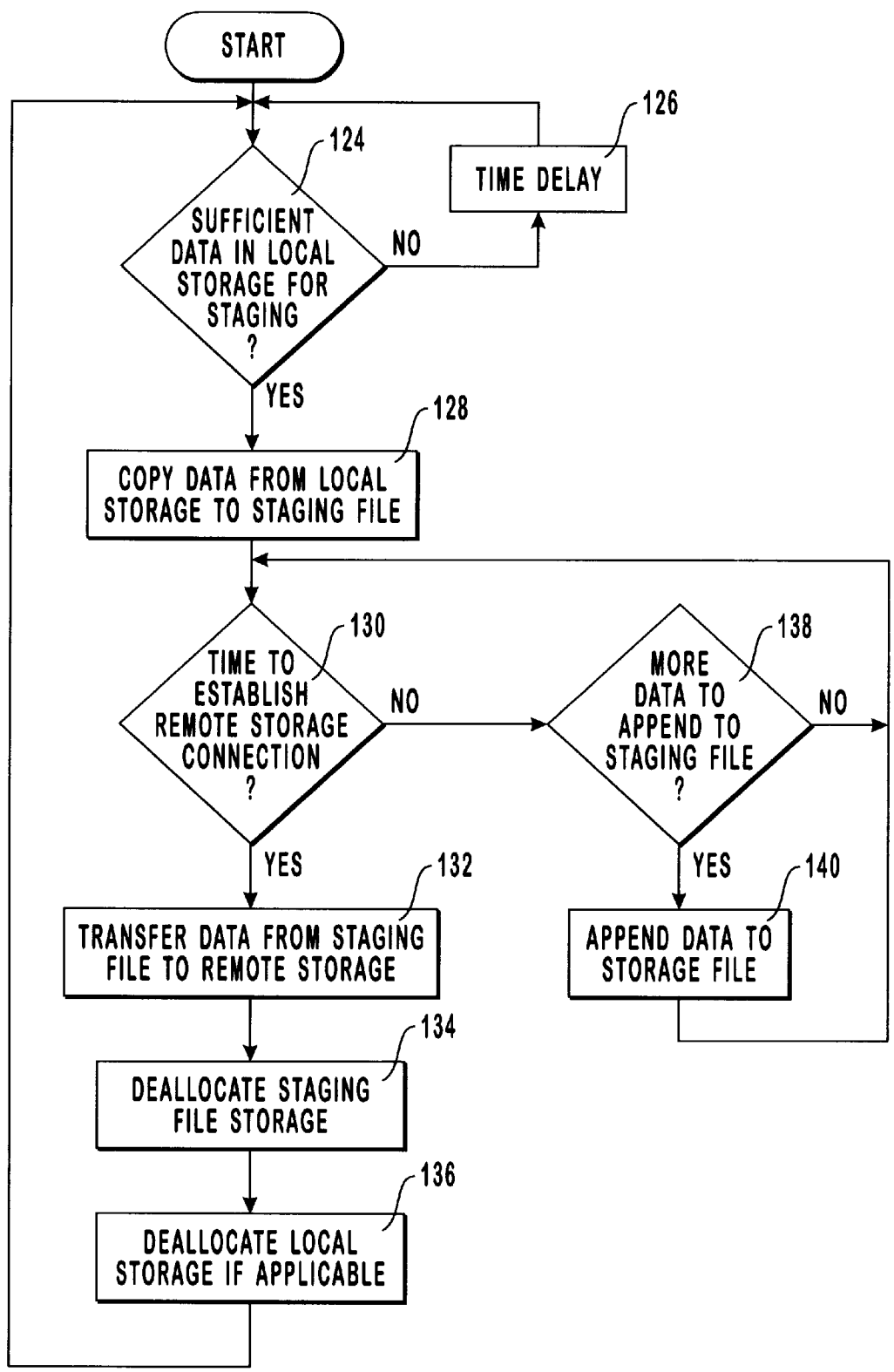
FIG. 5 is a flow diagram according to the present invention.

Referring now to FIG. 5, a flow diagram illustrating the steps one embodiment may utilize to backup or archive data stored locally to remote storage is presented. In FIG. 5, the method begins with decision block 124 which identifies whether sufficient data resides in local storage for staging to a staging area. If sufficient data does not reside in local storage for staging, the system waits for a given period of time illustrated in FIG. 5 by time delay 126, and then rechecks the amount of data in local storage. Note that decision block 124 and time delay 126 illustrate a mechanism whereby a system periodically checks to see if sufficient data resides in local storage to be staged to the staging file. Rather than staging data to a staging area when a given amount of local storage is utilized, other embodiments of the system may stage whatever data is available on a periodic basis without regard to the amount of data in local storage. In other words, the triggering event for staging data to the staging area would be the expiration of an elapsed time rather than the accumulation of an amount of data.

Returning now to FIG. 5, once the triggering event has occurred, whether that be the accumulation of a given amount of data, the expiration of a given time delay, the receipt of a command to stage data, or any other triggering event, execution proceeds to step 128 where data is copied from local storage to the staging file. This step may take one of several forms. For example, if the data is to reside both locally and remotely, step 128 may be a simple copy to duplicate the appropriate data so that the data resides both in local storage and in the staging file. If, however, data is to be moved from local storage to remote storage, then step 128 may move the data from local storage to the staging area so the data resides only in the staging area and not in the local storage area. Note, however, that even if the data was to be moved from local storage to remote storage, it may be desirable to simply copy the data at this point so that the data resides both in local storage and in the staging file and then after the data has been successfully placed on remote storage delete or eliminate the data from local storage. This is explained in greater detail in conjunction with step 136 below.

After the data has been copied to the staging file in step 128, the system then awaits for a second triggering event. In various embodiments, this triggering event may be one of several things. For example, an embodiment may use a command received from an outside source as the triggering event. In another embodiment, the triggering event may comprise the expiration of a fixed time. In yet another embodiment, the triggering event may comprise the presence of a certain amount of data in the staging file. In the embodiment illustrated in FIG. 5, the triggering event is the expiration of a time delay. Thus, decision block 130 determines whether it is time to establish a remote storage connection. If not, then execution proceeds to decision block 138 where a determination is made as to whether more data should be appended to the staging file. This determination may be made based on any triggering event, as previously explained in conjunction with decision block 124 and decision block 130. If more data that should be appended to the staging file exists, then the data is appended in step 140. In either case, execution proceeds back to decision block 130 in order to wait for the occurrence of the second triggering event that will initiate connection to remote storage.

As previously explained, remote storage does not necessarily mean that the backup or archive storage is located at a remote location. The designation means that the backup or archive storage is separate from the local storage area. On the other hand, the remote storage may indeed be located at a remote location. Thus, depending on the type of storage used as the remote storage, establishing a connection to the remote storage may simply be writing to a disk or other storage device attached to the computer where the backup or archive service is located, or may be much more complicated and may involve establishing connections over networks, dial-up connections, connections through other computer systems, and so forth. The mechanism used will depend on the type of remote storage used.

When the second triggering event occurs and it is time to establish a connection to remote storage, step 132 then indicates that the data should be transferred from the staging file to remote storage. The exact mechanism used to transfer the data will depend upon the type of remote storage used. As previously discussed, this may be nothing more than writing data to a local disk or other storage device or this may require transferring data over various networks or via various computer systems or other intermediate devices to remote storage.

After the data has been transferred to remote storage, there is no need to maintain the data in the staging file. Thus, step 134 indicates that the data storage used to store the transferred data in the staging file should be deallocated. This will reduce the amount of storage used by the staging file. If sparse file technology, such as that illustrated in FIG. 4, is used as the staging file, then deallocating the storage space may be nothing more than replacing the transferred data with zeroes. The mechanism used for sparse file technology will then eliminate the zero clusters and will not store them on whatever storage medium is used for the staging file. If other technologies are used to stage the data, then other mechanisms may be necessary to deallocate the storage in the staging file. It is preferable, however, that the deallocation procedure incur minimal overhead for the backup or archive system.

Step 136 of FIG. 5 indicates that local storage may then be deallocated if applicable. If the intent is to maintain copies of the data both locally and remotely, then obviously it would not be desirable to deallocate the local storage when data had been copied to remote storage. If, on the other hand, it was desirable to maintain the data remotely and not locally, then once the data has been moved to remote storage, it may safely be deleted from local storage. As previously discussed, it may also be possible to perform this step after step 128. Whether the step is performed after step 128 or in the present location as illustrated in FIG. 5 will depend upon various design choices made when implementing a particular system.

Figure 6:
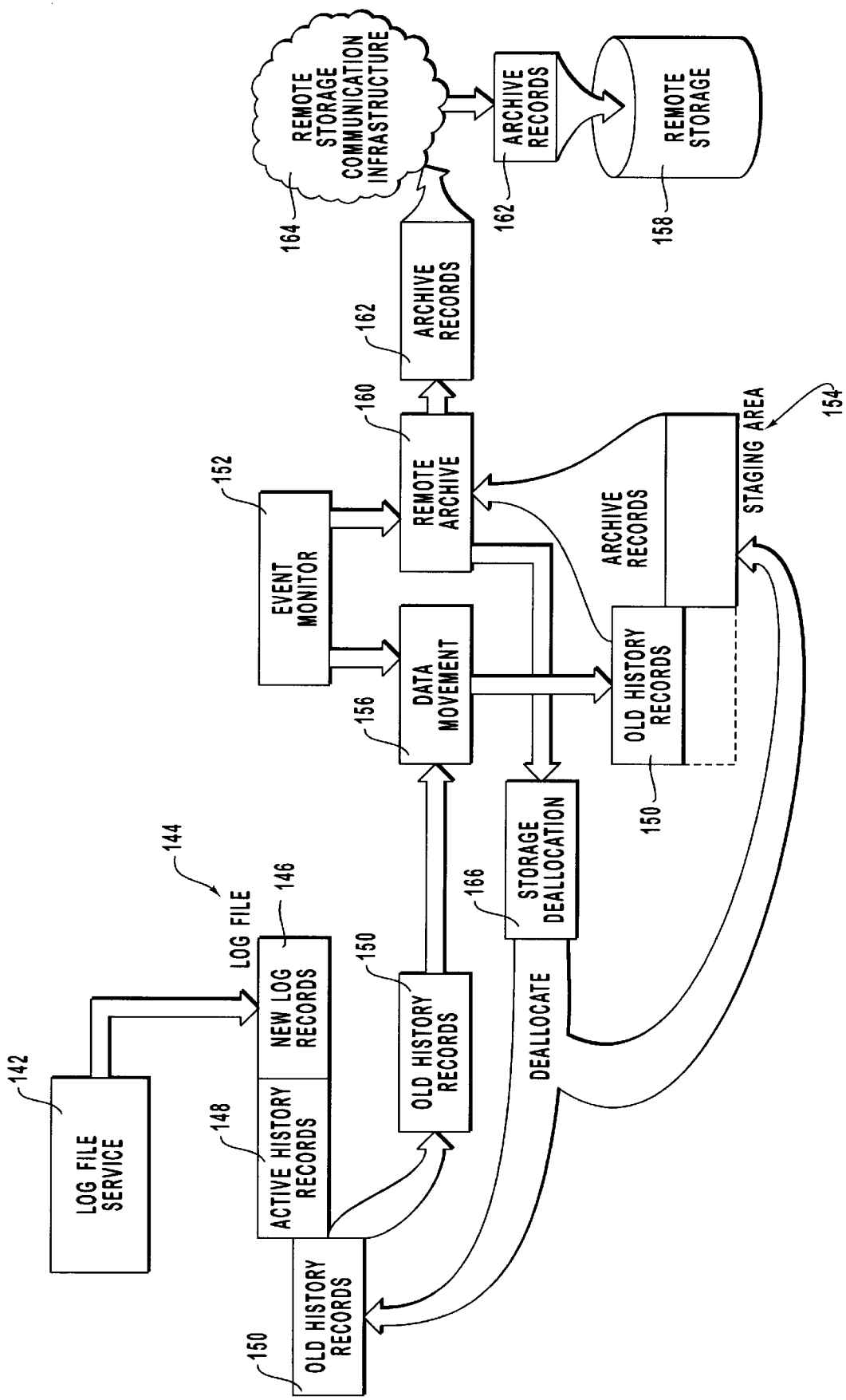
FIG. 6 is another embodiment of the present invention.

Referring next to FIG. 6, a particular example of a situation where the data should be maintained remotely but not locally is presented. This example occurs in the context of a log file. Log files are used in various situations where it is desirable to track a sequence of vents or changes as they occur. As an example, NTFS uses a log file to track changes made to a disk volume in order to allow recovery of the volume should errors occur. In FIG. 6, the log file service or producer of the log file is illustrated as 142. The log file service creates a log file shown generally as 144. Because a log file captures a stream or sequence of events or changes, log files may be implemented in an append-only type file where new entries are appended to the end of a file as the events or changes occur. Depending upon the type of events logged and the frequency with which these events occur, a log file may grow quite large. In addition, it is often not necessary to maintain the complete log file in local storage. It is generally sufficient to maintain a short portion or archive history of the log file with access to any records in the log file if needed. This situation makes a log file an ideal candidate for an archiving service which takes log entries that meet a certain criteria and archives them remote to storage and removes them from local storage.

In FIG. 6, the log file is illustrated as having three portions. New log records 146 contains the new records being placed in the log file. Active history records 148 contains that portion of the log file which should be maintained on local storage in order to have immediate access to the records contained therein. Old history records 150 contains those records which have met the archive criteria and can be safely archived on remote storage and removed from local storage.

Generally, an embodiment of the present system will utilize various triggering events to indicate that certain actions should be performed. For example, one embodiment of the present system may check every so often to identify whether any records in the log file fall into the old history records category and may be migrated safely to archive storage. As another alternative perhaps the archive system monitors how many records fall into the old history category and when a sufficient number have accumulated then the archive system begins the migration process. As yet another example, perhaps the archive system is responsive to outside requests to begin archive operations. Other triggering events may also be utilized. Embodiments that use such triggering events may comprise means for monitoring when a pre-determined event occurs. Based on these pre-determined events occurring, the archive system may take various actions. In FIG. 6 such means for monitoring when a pre-determined event occurs is illustrated, for example, by event monitor 152. Event monitor 152 may be implemented in a wide variety of ways. In modern operating systems, for example, many programs, services, or processes, are event driven. This means that the service, program, or process will take certain actions when certain events occur. Thus, services, programs, processes, and the like built on this model may contain built-in mechanisms for monitoring when various events occur. These mechanisms may be modified appropriately to watch for desired triggering events and to initiate appropriate action when the events occur. As another alternative, the means for monitoring may go out and actively check to see whether certain events have occurred. In the embodiment illustrated in FIG. 6, event monitor 152 may trigger movement of old history records 150 into a staging area, such as staging area 154.

Since old history records 150 are to be moved from log file 144 to staging area 154, embodiments within the scope of this invention may comprise means for moving data from a local storage area used for data storage by a data producing service to a staging area. By way of example, and not limitation, in FIG. 6 such means for moving data comprises data movement block 156. In FIG. 6, data movement block 156 is responsible for copying old history records 150 to staging area 154. Any mechanism which allows old history records 150 to be copied to staging area 154 may be utilized for data movement block 156. Although it is anticipated that data movement block 156 will simply copy old history records 150 to staging area 154, as previously explained in conjunction with FIG. 5 it may also be possible to move old history records 150 to staging area 154 so that they are eliminated from log file 144 as they are moved.

The embodiment in FIG. 6 uses staging area 154 to stage data prior to transfer to remote storage, such as remote storage 158. It is anticipated that old history records 150 will comprise a mixture of zero data and non-zero data. Embodiments in the present invention may, therefore, comprise means for storing sparse data comprising a mixture of zero data and non-zero data in a storage space substantially equal to the storage space required to store the non-zero data. In other words, embodiments may comprise a mechanism for storing data in a storage space substantially equal to the storage space required to store only the non-zero data. In FIG. 6 such a means is illustrated, by way of example, by staging area 154. As previously discussed, such a means may be implemented by using sparse file storage technology, such as the sparse file technology explained in conjunction with FIG. 4. Other mechanisms may also be used such as various data compression mechanisms and the like. The overall goal is to reduce the storage space required for staging and, to a lesser extent, reduce the overhead associated with managing the storage space of the staging area.

Once data has been moved into staging area 154, when a second triggering event occurs, the data is transferred from staging area 154 to remote storage 158. The triggering event may again be monitored by a means for monitoring when a pre-determined event occurs, such as event monitor 152. In FIG. 6, the means for transferring data from a staging area to remote storage is illustrated by remote archive block 160. Archive block 160 may be any mechanism which extracts appropriate information from staging area 154 and transfers the information via an appropriate mechanism to remote storage 158. Recall that remote storage 158 may comprise a wide variety of storage mechanisms, such as a disk or other storage device directly attached to the computer where the archive system resides, a remote storage device accessed via a network or dial-up connection, or a remote storage device accessed via an intermediary or other intermediary device.

In FIG. 6, the process of extracting the appropriate information from staging area 154 and transferring it to remote storage 158 is illustrated by archive records 162 being transferred to remote storage 158 via remote storage communication infrastructure 164. Remote storage communication infrastructure 164 may comprise any mechanism necessary to communicate and transfer information to remote storage 158.

Once data has been safely transferred to remote storage 158, the data may be safely removed from the log file and/or the staging area. Embodiments within the scope of this invention may therefore comprise means for deallocating storage space in a local storage area and/or means for deallocating storage space in a staging area. In FIG. 6, such means is illustrated by way of example by storage deallocation block 166. In FIG. 6, an embodiment is presented that deals with a log file. In such a situation, it is probably not necessary to maintain the old history records in the log file. Thus, the means for deallocating may include both means for deallocating local storage and means for deallocating staging area storage. Note that the means for deallocating each of these individual storage types may be very different. How the storage is deallocated will be dependent upon the particular storage mechanism used for the staging area and local storage. If, for example, staging area 154 is implemented using the sparse file technology previously explained, the archive records that have been transferred to remote storage 158 may be deallocated simply be zeroing them in the sparse file used for staging area 154. Then, as previously explained in conjunction with FIG. 4, the nature of the sparse file will result in the zeroed sectors being physically deallocated from the file. Similar mechanisms may be used for log file 144, although it is not necessary to use the same sparse file technology.

In summary, the present invention provides systems and methods for backing up or archiving data to remote storage in such a manner that the staging storage area uses a minimal amount of storage space and is managed with little or no overhead to the backup or archive system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system that includes a processor for producing data that is stored and used by the processor at a local storage area, and a remote storage area for backing up or archiving the data, a method for transferring the data from the local storage area to the remote storage area which minimizes storage requirements at the remote storage area as well as administrative burden in transferring the data, comprising the steps of:

monitoring the data produced by the processor at the local storage area by looking for a first triggering event that signals that the data at the local storage area is ready to be copied to a staging area;

upon detecting the first triggering event, transferring a copy of the data from the local storage area to the staging area;

processing at one or more sparse files the transferred copy of the data in order to create corresponding data with reduced storage requirements that is then used to replace the copy;

monitoring the sparse files at the staging area by looking for a second triggering event that signals that the corresponding data with reduced storage requirements generated at the one or more sparse files is ready to be transferred to the remote storage area; and upon detecting the second triggering event, transferring the corresponding data with reduced storage requirements from the staging area to the remote storage area.

2. A computer program product for use in a computer system that includes a processor for producing data that is stored and used by the processor at a local storage area, and a remote storage area for backing up or archiving the data, the computer program product comprising a computer readable medium for carrying executable instructions that are used to implement in the computer system a method for transferring the data from the local storage area to the remote storage area which minimizes storage requirements at the remote storage area as well as administrative burden in transferring the data, and wherein said method is comprised of the steps of:

monitoring the data produced by the processor at the local storage area by looking for a first triggering event that signals that the data at the local storage area is ready to be copied to a staging area;

upon detecting the first triggering event, transferring a copy of the data from the local storage area to the staging area;

processing at one or more sparse files the transferred copy of the data in order to create corresponding data with reduced storage requirements that is then used to replace the copy;

monitoring the sparse files at the staging area by looking for a second triggering event that signals that the corresponding data with reduced storage requirements generated at the one or more sparse files is ready to be transferred to the remote storage area; and upon detecting the second triggering event, transferring the corresponding data with reduced storage requirements from the staging area to the remote storage area.

3. A method as recited in claim 1 or 2 wherein said first triggering event occurs when said local storage area contains a predetermined amount of data.

4. A method as recited in claim 1 or 2 wherein said first triggering event occurs when a predetermined time has elapsed.

5. A method as recited in claim 1 or 2 wherein said first triggering event comprises a direction from an outside source to archive data.

6. A method as recited in claim 1 or 2 wherein said second triggering event occurs when said sparse file contains a predetermined amount of data.

7. A method as recited in claim 1 or 2 wherein said second triggering event occurs when a predetermined time has elapsed.

8. A method as recited in claim 1 wherein said second triggering event comprises a direction from an outside source to initiate transfer of data to said remote storage area.

9. A method as recited in claim 1 further comprising a step of deallocating local storage space after one of either said copying step or said transferring step.

10. A method as recited in claim 1 further comprising a step of deallocating space in said one or more sparse files substantially equal to an amount of space corresponding to the data transferred to said remote storage area.

11. A method as recited in claims 1 or 2 which is further comprised of a stop of deallocating an amount of storage space at the staging area that is substantially equal to the storage space required by the data transferred to the remote storage area in order to free up additional storage space at the staging area.

12. A method as recited in claim 11 wherein said staging area comprises a sparse file that substantially eliminates any storage space for nonzero data.

13. A method as recited in claim 11 wherein said first triggering event occurs when said local storage area contains a predetermined amount of data.

14. A method as recited in claim 13 wherein said second triggering event occurs when a predetermined time has elapsed.

15. A method as recited in claim 14 wherein said first triggering event occurs when a predetermined time has elapsed.

16. A method as recited in claim 15 wherein said second triggering event occurs when a predetermined amount of data has accumulated in said sparse file.

\* \* \* \* \*

UNITED STATES PATENT AND TRADEMARK OFFICE
CERTIFICATE OF CORRECTION

PATENT NO. : 5,953,729
DATED : September 14, 1999
INVENTOR(S) : Luis Felipe Cabrera, Stefan R. Steiner It is certified that error appears in the above-identified patent and that said Letters Patent is hereby corrected as shown below:

Col. 1, ln. 27: after "backup" change "are" to --or--

Col. 1, ln. 27: after "archiving" change "or" to --are--

Col. 4, ln. 60: after "can" and before "accessed" insert --be--

Col. 9, ln. 16: after "98" change "represents" to --represent--

Col. 10, ln. 25: after "attribute" change "allow" to --allows--

Col. 12, ln. 22: after "sequence of" change "vents" to --events--

Col. 13, ln. 67: after "intermediary" and before "or other" insert --computer--

Col. 14, ln. 28: after "simply" change "be" to --by--

Signed and Sealed this

Twenty-fourth Day of October, 2000

Attest:

Q. TODD DICKINSON

*Attesting Officer*  *Director of Patents and Trademarks*